United States Patent
Kumar et al.

(10) Patent No.: US 9,378,472 B2
(45) Date of Patent: Jun. 28, 2016

(54) SYSTEMS AND METHODS FOR ENABLING AND CONFIGURING TRACKING OF USER INTERACTIONS ON COMPUTER APPLICATIONS

(75) Inventors: Rani Kumar, Bangalore (IN); Ramanarayanan Krishnaiyer, Bangalore (IN)

(73) Assignee: Adobe Systems Incorporated, San Jose, CA (US)

(*) Notice: Subject to any disclaimer, the term of this patent is extended or adjusted under 35 U.S.C. 154(b) by 1273 days.

(21) Appl. No.: 12/341,180

(22) Filed: Dec. 22, 2008

(65) Prior Publication Data

US 2014/0250425 A1 Sep. 4, 2014

(51) Int. Cl.
*G06F 15/16* (2006.01)
*G06F 9/44* (2006.01)
*G06Q 10/06* (2012.01)
*G06F 11/30* (2006.01)
*G06F 11/34* (2006.01)
*G06Q 30/02* (2012.01)

(52) U.S. Cl.
CPC ............ *G06Q 10/06* (2013.01); *G06F 11/3003* (2013.01); *G06F 11/3072* (2013.01); *G06F 11/3438* (2013.01); *G06Q 30/02* (2013.01); *G06F 11/3466* (2013.01); *G06F 2201/86* (2013.01); *G06F 2201/865* (2013.01)

(58) Field of Classification Search
CPC ............... G06Q 10/06; G06F 2201/86; G06F 2201/865; G06F 9/4445
See application file for complete search history.

(56) References Cited

U.S. PATENT DOCUMENTS

| | | | |
|---|---|---|---|
| 5,796,952 A * | 8/1998 | Davis et al. ................... | 709/224 |
| 6,021,262 A * | 2/2000 | Cote et al. ...................... | 714/48 |
| 6,169,979 B1 * | 1/2001 | Johnson ........................ | 705/412 |
| 6,606,657 B1 * | 8/2003 | Zilberstein et al. ........... | 709/224 |
| 6,615,166 B1 | 9/2003 | Guheen et al. | |
| 6,662,312 B1 | 12/2003 | Keller et al. | |
| 6,907,546 B1 | 6/2005 | Haswell et al. | |
| 6,925,633 B1 | 8/2005 | Barnett et al. | |
| 6,985,901 B1 | 1/2006 | Sachse | |
| 7,010,454 B1 | 3/2006 | Potter, IV et al. | |

(Continued)

OTHER PUBLICATIONS

Aldred et al., Playscripts a new method for analyzing game design and play, Nov. 2007, 4 pages.*

(Continued)

*Primary Examiner* — Thuy Dao
(74) *Attorney, Agent, or Firm* — Kilpatrick Townsend & Stockton LLP

(57) ABSTRACT

Methods and systems for tracking user interactions with a computer application. As a computer application is used, it keeps track of user interactions, for example, for use on an analytics server. An interaction tracking configuration may specify which events are tracked, under what conditions the events are tracked, and identify what information is recorded. This configuration may be separated from the application. For example, the configuration may be stored in a configuration file at a location specified within and used by an application. The configuration may then be changed without changing a deployed application. Certain embodiments provide a tracking configuration tool to facilitate the creation of such a configuration. The tool may use a running application to identify events for tracking. Identifying events in this way can simplify the task of configuring interaction tracking by reducing the need for understanding or accessing of the actual code of the application.

25 Claims, 7 Drawing Sheets

(56) References Cited

U.S. PATENT DOCUMENTS

| | | | |
|---|---|---|---|
| 7,266,733 B2* | 9/2007 | Bazinet et al. | 714/45 |
| 7,337,435 B2* | 2/2008 | Bell et al. | 717/136 |
| 7,389,490 B2* | 6/2008 | Roesner et al. | 716/102 |
| 7,406,516 B2* | 7/2008 | Davis et al. | 709/224 |
| 7,412,691 B2* | 8/2008 | Bognar | 717/121 |
| 7,607,126 B2* | 10/2009 | Read | 717/172 |
| 7,725,508 B2* | 5/2010 | Lawarence et al. | 707/830 |
| 7,860,961 B1* | 12/2010 | Finkelstein et al. | 709/223 |
| 7,870,240 B1* | 1/2011 | Horvitz | G06Q 10/06 709/223 |
| 8,032,862 B2* | 10/2011 | Bognar | 717/121 |
| 8,176,480 B1* | 5/2012 | Spertus | 717/158 |
| 8,326,651 B2* | 12/2012 | McLaren | G06F 19/322 600/300 |
| 8,392,553 B2* | 3/2013 | Petropoulakis | G06F 11/3006 709/224 |
| 9,189,124 B2* | 11/2015 | Pahlavan | G06F 3/0481 |
| 2002/0026359 A1* | 2/2002 | Long et al. | 705/14 |
| 2002/0046281 A1* | 4/2002 | Cope | 709/227 |
| 2002/0103664 A1* | 8/2002 | Olsson et al. | 705/1 |
| 2002/0147570 A1* | 10/2002 | Kraft et al. | 702/186 |
| 2002/0174421 A1* | 11/2002 | Zhao et al. | 717/174 |
| 2002/0198824 A1* | 12/2002 | Cook | 705/38 |
| 2003/0065770 A1* | 4/2003 | Davis et al. | 709/224 |
| 2003/0070063 A1* | 4/2003 | Boyle et al. | 713/2 |
| 2004/0041827 A1 | 3/2004 | Bischof et al. | |
| 2004/0117259 A1* | 6/2004 | Morrisroe et al. | 705/14 |
| 2005/0273521 A1* | 12/2005 | Patrick et al. | 709/246 |
| 2007/0061195 A1* | 3/2007 | Liu et al. | 705/14 |
| 2007/0180490 A1* | 8/2007 | Renzi et al. | 726/1 |
| 2008/0034088 A1* | 2/2008 | Suresh | 709/224 |
| 2008/0140524 A1* | 6/2008 | Anand et al. | 705/14 |
| 2008/0168423 A1* | 7/2008 | Daskal | G06Q 10/10 717/120 |
| 2008/0263519 A1* | 10/2008 | Bognar | 717/121 |
| 2010/0235813 A1* | 9/2010 | Manczak et al. | 717/121 |
| 2011/0246528 A1* | 10/2011 | Hsieh et al. | 707/791 |

OTHER PUBLICATIONS

B. Ludwig, Tracing actions helps in understanding interactions, Jul. 2009, 8 pages.*
P. Kemper et al., Trace based analysis of process interaction models, Dec. 2005, 10 pages.*
Auto Test Flash, Open Source Flash, copyright 2005-2007, [printed from internet on Jan. 23, 2008], http://www.osflash.org/autotestflash?s=testing+tool, pp. 1-2.
Ram, K. Automated Testing of Flex Applications, Adobe Systems Incorporated, Jun. 22, 2006, pp. 1-11.
U.S. Appl. No. 12/019,022, filed Jan. 24, 2008, Annam.

* cited by examiner

SYSTEMS AND METHODS FOR ENABLING AND CONFIGURING TRACKING OF USER INTERACTIONS ON COMPUTER APPLICATIONS

FIELD

Embodiments relate generally to the field of computing and specifically to tracking and using information on computer applications.

BACKGROUND

There are various reasons for tracking and analyzing user interactions with a computer application. For example, user interaction with a web based application may be tracked to determine conversion rate, such as, for example, how many users who logged in ultimately purchased a given product. As another example, user interaction with a web based application may be tracked to assess usability, including from what options the user has reached a given destination point within the application. As yet another example, user interaction with a web based application may be tracked to perform technology analysis, for example, allowing a company to compare the results of different technologies used within an application.

There are various solutions that allow web applications to track user interactions. In many cases, developers are required to write specific code in an application to send user interaction data from the application to an analytics server. To implement a change with respect to collecting user interaction data, a developer is further required to change the code and redeploy the application. In any case, programmatically enabling analytics often requires a significant amount of coordination between a developer implementing the analytics and a data analyst who is familiar with the information that needs to be captured. In some cases, the translation of technical information to marketing and other non-technical requirements hinders or prevents adequate development of user interaction analytic functionality.

SUMMARY

Methods and systems for tracking user interactions with a computer application are disclosed. As a computer application is used, it keeps track of user interactions, for example, for use on an analytics server. An interaction tracking configuration may specify which events are tracked, under what conditions the events are tracked, and identify what information is recorded. This configuration may be separated from the application. For example, the configuration may be stored in a configuration file at a location specified within and used by an application. The configuration may then be changed without changing a deployed application. Certain embodiments provide a tracking configuration tool to facilitate the creation of such a configuration. The tool may use a running application to identify events for tracking. Identifying events in this way can simplify the task of configuring interaction tracking by reducing the need for understanding or accessing of the actual code of the application.

One embodiment provides a method of providing interaction tracking configuration information separate from an application. The method involves providing an application that includes an indication of a location of an interaction tracking configuration file separate from the application. The application may use an interaction tracking code library to implement interaction tracking according to interaction tracking detail information from the interaction tracking configuration file. The method further comprises providing the interaction tracking configuration file at the location specified in the application. The method further comprises receiving a revision to the interaction tracking configuration file and storing a revised interaction tracking configuration file at the location, wherein the application implements interaction tracking according to the revised interaction tracking configuration file.

Another embodiment provides a method of configuring interaction tracking for an application. This exemplary method uses a running version of the application to allow identification of events that will be tracked. A tracking configuration tool may facilitate the configuration of interaction tracking details. Accordingly, in one embodiment, the method involves receiving, at a tracking configuration tool, an identification of an event associated with an interaction with an application. The tracking configuration tool may be run concurrently with the application and thus receive event identifications from the concurrently running application. The method further comprises providing details of the event for display in the tracking configuration tool. These details may also be received from the running application. The method further involves receiving an indication of whether to track the event or not, the indication of whether to track the event or not received in the tracking configuration tool. For example, an analyst may use the tool to select whether the event should be tracked or not. Once events have been identified for tracking and appropriately configured as necessary, the method involves providing an interaction tracking configuration for use by the application in tracking the event as specified by the interaction tracking configuration when the event occurs during execution of the application. For example, the tracking configuration tool may provide a configuration file that specifies the events that will be tracked by the application and under what conditions the events will be tracked.

In other embodiments, a computer-readable medium (such as, for example, random access memory or a computer disk) comprises code for carrying out the methods and systems described herein.

These illustrative embodiments are mentioned not to limit or define the invention, but to provide examples to aid understanding thereof. Illustrative embodiments are discussed in the Detailed Description, and further description of the disclosure is provided there. Advantages offered by various embodiments of this disclosure may be further understood by examining this specification.

BRIEF DESCRIPTION OF THE DRAWINGS

These and other features, aspects, and advantages of the present invention are better understood when the following Detailed Description is read with reference to the accompanying drawings, wherein.

DETAILED DESCRIPTION OF EXEMPLARY EMBODIMENTS

Figure 1:
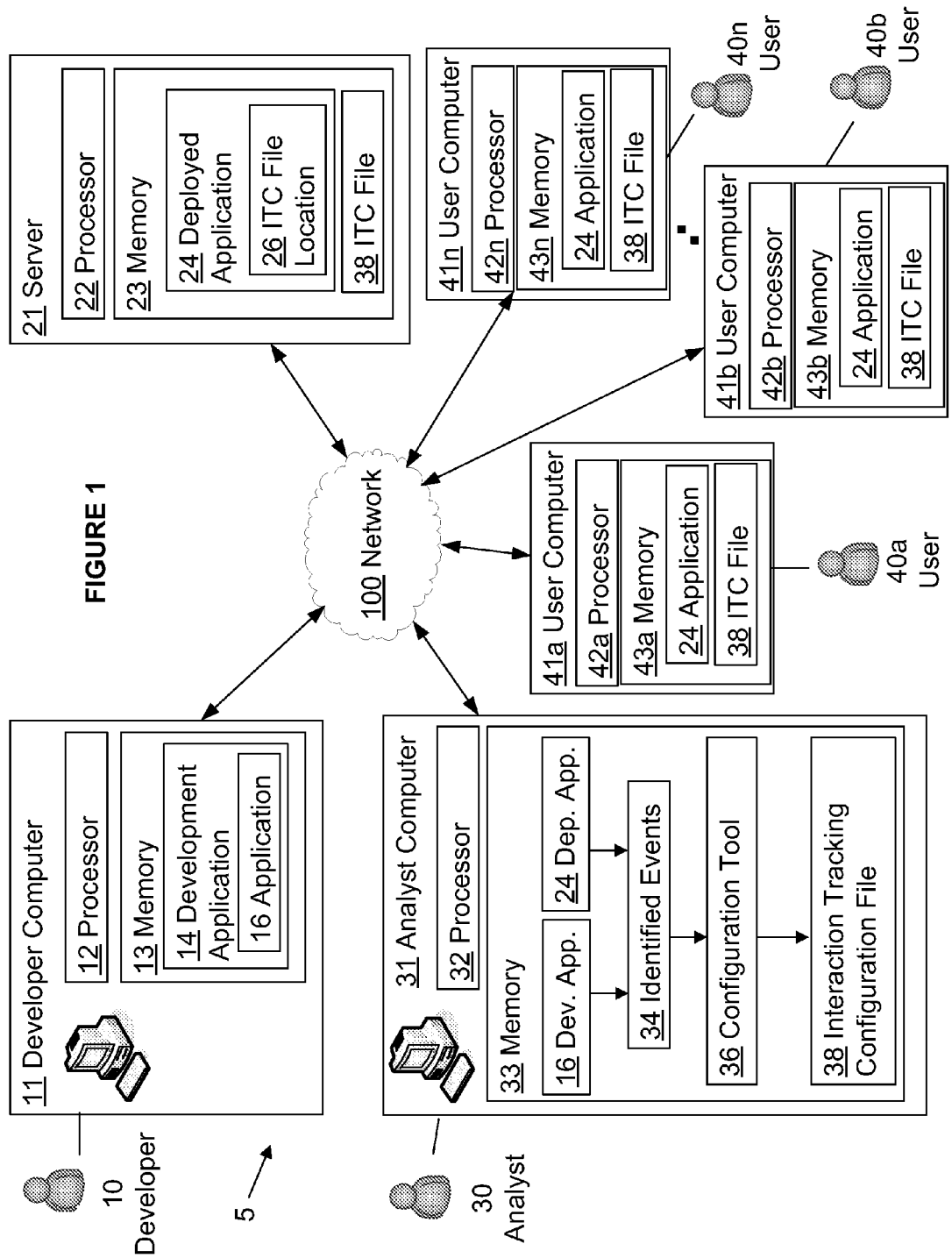
FIG. 1 illustrates an exemplary system according to certain embodiments.

Methods and systems for tracking user interactions with a computer application are disclosed. Tracking user interactions can provide information that can be analyzed for a variety of reasons and achieve a variety of benefits. A computer application can be deployed and used by one or more users. As the computer application is used, it keeps track of the user interactions and provides information about the interactions to an analytics server or other recipient. The details of this interaction tracking, referred to herein as the interaction tracking configuration, may specify which types of user interactions are tracked.

Certain embodiments involve separating the interaction tracking configuration from the application program. For example, the interaction tracking configuration may be stored in a configuration file and stored at a location specified within the application. This allows the interaction tracking configuration to be changed without changing a deployed application. For example, initially a marketing team may have decided to track how many users have selected a product details tab in an application. At a later point of time, the marketing team may want to know more details about how many users were interested in a particular phone model. An analyst can simply generate a new interaction tracking configuration file to replace the prior file. The tracking functionality of the previously deployed application will automatically change based on the changed interaction tracking configuration file.

Certain embodiments provide a tracking configuration tool to facilitate the configuration of interaction tracking. In some cases, a tracking configuration tool facilitates the identification of events that will be tracked. For example, it may allow an analyst to use a running version of the application to identify events that the analyst wishes to track. Identifying events in this way can simplify the analyst's configuration tasks by reducing the need for the analyst to understand or access the actual code of the application.

Events can be identified from a running version of the application in a variety of ways. For example, an analyst may run the application and, at the same time, run a tracking configuration tool. As the analyst uses the application, triggering events within the application, the application may send information about these triggered events to the tracking configuration tool. For example, if the user clicks on a button in the running application, the tracking configuration tool may display information about this click event and allow the analyst to specify whether this event is to be tracked and to configure specific details about the tracking of the event. An event identification component that identifies events triggered on the running application may (or may not) filter low level events to identify events with an appropriate amount of granularity and detail. For example, enough detail may be provided to allow an analyst to distinguish between a user clicking on a header on a datagrid and the user clicking on a particular item on the data grid.

The result of configuring interaction tracking using such a tool may produce an interaction tracking configuration file or otherwise produce or compile interaction tracking configuration information for one or more applications. In addition, certain embodiments provide a configuration tool that facilitates the configuration of meaningful analytics and provides translation of technical information into marketing or non-technical information. For example, a datagrid click event may be identified by a configuration tool and reframed with an appropriate business term, such as, for example, "product selection-mobile."

Generally, certain embodiments simplify and/or add flexibility to the process of configuring user interaction tracking. For example, an application may be developed to include a list of user-selectable options, including a mobile phone option, a PDA option, and a headset option. Certain embodiments allow a variety of different configurations to be specified. A configuration may be specified identifying "selection of a list item" as an event and the "PDA option" as a value such that information about selection of the PDA option is tracked. Anytime the application is executed and a user selects the PDA option from the list, the application, based on the interaction tracking configuration, will track information about this user interaction. Thus, the interaction tracking may be configured to filter user events based on the particular event (such as, for example, list item selection) and based on a specified value (such as, for example, the "PDA" list item option).

As another example, an application may display widgets offered by a company as separate components, each including a model name, a price, and a picture. In one configuration, analytics may be used to track an "add to cart" event only when the user has selected a particular widget. Alternatively, or in addition, analytics may be configured to track any interaction with any widget component, tracking the details of the widget with which the user interacted. Similarly, alternatively, or in addition, analytics may be configured to track an event for a given widget regardless of where in an application the user interacts with the widget. Thus, if the widget is displayed in a product list, a product specification screen, and on a check out screen, the analytics may track any interaction with the widget regardless of the location. In some cases, this type of analytics can be specified without identification of those multiple locations.

Certain embodiments allow generalizing events for identical objects. For example, if an application has a container listing widgets offered by a company with each group of widget information displayed using a separate component, tracking can be configured to, as examples, (a) track when the user has selected a particular product and send the details of the product which the user has selected or (b) track when the user interacts on any of these components and send the details of the components which the user has interacted.

The analytics configuration does not need to be event specific. For example, tracking may be performed upon any interaction on any instance of a particular class object. If a developer creates a new video component, analytics can be configured to check any interaction with the new component type. Such a generic configuration can be at the class level or involve a combination of class and operation, such as, for example, any usage of 'download music' button of a customized music player which is included in the applications in multiple places.

Illustrative Authoring and Runtime Environments

Referring now to the drawings in which like numerals indicate like elements throughout the several figures, FIG. 1 is a system diagram illustrating a system 5 according to certain embodiments. Other embodiments may be utilized. The system 5 shown in FIG. 1 comprises a developer computer 10, a server 21, a analyst computer 31, and one or more user computers 41*a-n*, each comprising a processor 12, 22, 32, 42*a-n* and memory 13, 23, 33, 43*a-n*, respectively. A developer 10 may use the development application 14 of the developer computer 10 to create an application 16 for deployment on server 21. For example, the development application 14 may include an interface that the developer 18 uses to create programming code or otherwise create the application 16.

After the developer is ready to publish or otherwise deploy an application 16, the application 16 can be sent through network 100 and stored as a deployed application 24 on server 21. The application 16 may include a reference identifying a location of an interaction tracking configuration file 26 that will be used by the deployed application 24. In this case, the interaction tracking configuration file 26 references a storage location for the interaction tracking configuration file 38 on the server 21. In other embodiments, the interaction tracking configuration file 38 is located elsewhere.

The analyst computer 31 is used, in this exemplary system, to configure the interaction tracking configuration file 38. An analyst 30 using the analyst computer 31 receives a copy of the application 16 or the deployed application 24 from the server 21. The analyst 30 then runs the application 16, 24 and a configuration tool 36 concurrently on the analyst's computer 31. As the analyst uses the application 16, 24, which in this case is running in configuration mode, the application 16, 24 identifies events 34, which are captured by the configuration tool. For example, if the analyst 30 selects a "Check out" option in the running application 16, 24, a "Check out" option selection event may be sent to the configuration tool 36. The analyst 30 can than use the configuration tool 36 to select whether the event (in this example, the "Check out" option selection event) will be tracked by the application 16, 24. The configuration tool 36 may allow the analyst 30 to further configure under which circumstances the event will be tracked and what information will be captured in the tracking.

Once the analyst has identified any desired interaction tracking for the application 34, the configuration tool may generate the interaction tracking configuration file 38 containing the details of the events and event information that will be tracked by the application 24. The configuration tool 36 or other feature of the analyst computer 31 may then be used to send/deploy the interaction tracking configuration file 38 to its required location, which in this case, is a location on server 21 identified by interaction tracking configuration file location 26.

The deployed application 24 can be retrieved and used by multiple users 40*a-n* using multiple user computers 41*a-n*. As the deployed application 24 is run on the user computers 41*a-n*, the application 24 access configuration information in interaction tracking configuration file 38. User interaction information is tracked and/or sent out according to the configuration interaction tracking configuration file 38. For example, as the user's trigger the "Check out" option selection event on a running version of the deployed application 24, which in these cases are running in tracking mode, the deployed application 24 can track information about these selections. For example, the deployed applications 24 may send a message to an analytics server (not shown), where information about user interactions are collected and analyzed.

After deployment of the application 24 and deployment of an initial interaction tracking configuration file 38, the analyst 30 may decide to track different events. The analyst may use the configuration tool 36 or any other means available to edit the interaction tracking configuration file 38 change the information that is tracked by the deployed application 24. Accordingly, in this embodiment, the analyst 30 is able to change the information tracked by the application 24 without redeploying the application 24.

The above described system configuration is described to provide context for certain exemplary embodiments and to aid understanding of certain aspects of the these embodiments. Additional system configurations and devices are or may be possible and, in some cases, appropriate. Description of these components is not intended to suggest that any component is necessary or essential to any feature or aspect of any embodiment.

Illustration of Enabling an Application for Analytics

In certain embodiments, enabling an application for user interaction tracking and analytics requires little or no change to the application's code. For example, in some embodiments, a developer may enable tracking and analytics simply by including one or more libraries and/or references to external file locations. For example, one or more libraries may comprise automatic event tracking code that is executed by the application upon the occurrence of an event if that event is identified in a configuration file that the application has access to. As a specific example, a library may enhance an application that is executed within a web browser to utilize cookies for persistent data storage of information about tracked interactions. Another embodiment may use a library that uses local storage for data persistence. Various other features may be provided by library components.

Certain embodiments involve allowing an application to run in two different modes: a configuration mode and a tracking mode. An exemplary configuration mode runs the application and the configuration tool locally on the same machine, as described in the example of FIG. 1. This mode can be used to create the configuration file which identifies the details of the events that will be tracked by the application. A tracking mode can be used during actual deployment of the application to send tracking interaction information according to the configuration file. A tracking mode may, in some cases, also be used to test the application locally. In certain embodiments, an application is tested offline, for example, to test the correctness of the configuration, the correctness of data, etc. In some cases, a sample test is saved, for example to a database or an XML file, to facilitate subsequent testing prior to deploying the application.

In one exemplary embodiment involving an application developed using Adobe® Flex Builder®, the application is enabled for interaction tracking configuration with the following relatively simple addition:

```
private var Agent:[Agent];
private function initTracker( ):void
{     Agent = new Agent ("UA51", 1,
      "http://yourdomain/adobe/allevent.xml");     }
```

This exemplary code initializes the Agent object with four parameters: analyst identifier (in this example "UA51"), mode (in this example "1" indicating configuration mode), a component detail file location (in this case, "http://yourdomain/adobe/allevent.xml"), and a configuration file location (in this case, blank because the mode is set to configuration).

Figure 2:
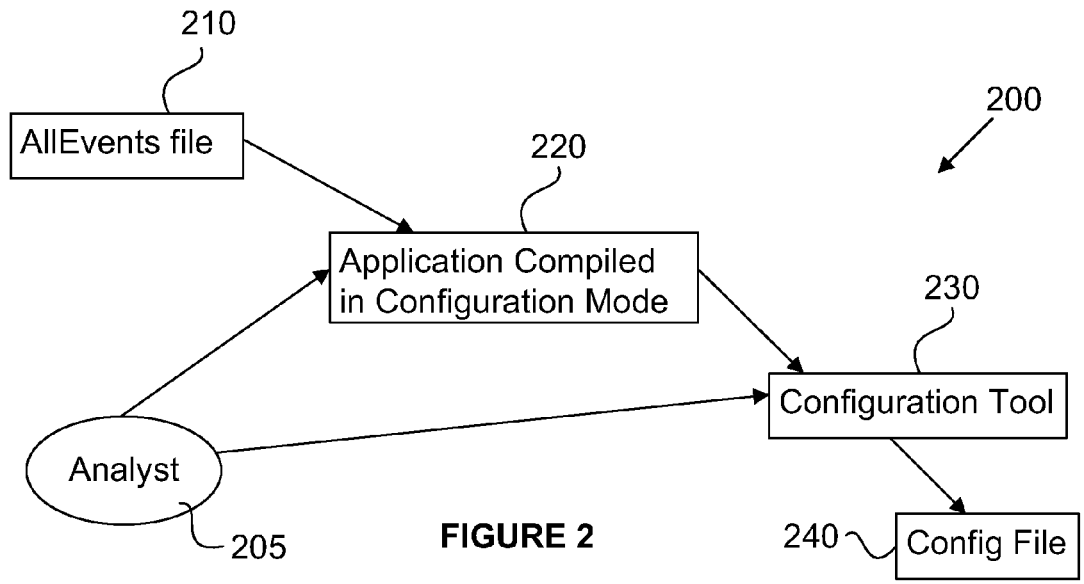
FIG. 2 illustrates an exemplary configuration mode workflow according to certain embodiments.

FIG. 2 illustrates an exemplary configuration mode workflow 200 according to certain embodiments. In this exemplary workflow 200, the analyst 200 run the application on his local desktop in configuration mode 220 and runs the configuration tool 230. The application, compiled in configuration mode 220, receives event information from an all events file 210 and uses this information to provide information about the analyst's interactions to the configuration tool 230. The configuration tool 230 receives this information and any configuration customizations from the analyst 220 and produces a configuration file that includes the details of the interaction tracking configuration. The allevents file 210 and the config file 240 can have any suitable format including formats different from one another. In one exemplary embodiment, the allevents file 210 and the config file 240 each have an extensiblte markup language (XML) format. The configuration tool 230 can provide a convenient means for an analyst 200 to select, modify, and customize the configuration information stored in the config file 240, which can then be used as an input when the application is deployed in tracking mode.

An application can be converted to tracking mode in a variety of ways. One example involves simply revising the Agent initialization code described previously. For example, the code may be revised to:

```
private var Agent:[FlexAgent];
private function initFlexTracker( ):void
{       Agent = new FlexAgent ( , 2,
        "http://yourdomain/adobe/allevent.xml",
        "http://yourdomain/adobe/configfile.xml") }
```

This exemplary code initializes the FlexAgent object with different values for the same four parameters: analyst identifier (in this example not specified), mode (in this example "2" indicating tracking mode), a component detail file location (in this case, "http://yourdomain/adobe/allevent.xml"), and a configuration file location (in this case, http://yourdomain/adobe/configfile.xml specifying the storage location of the configuration file created during the configuration mode).

Figure 3:
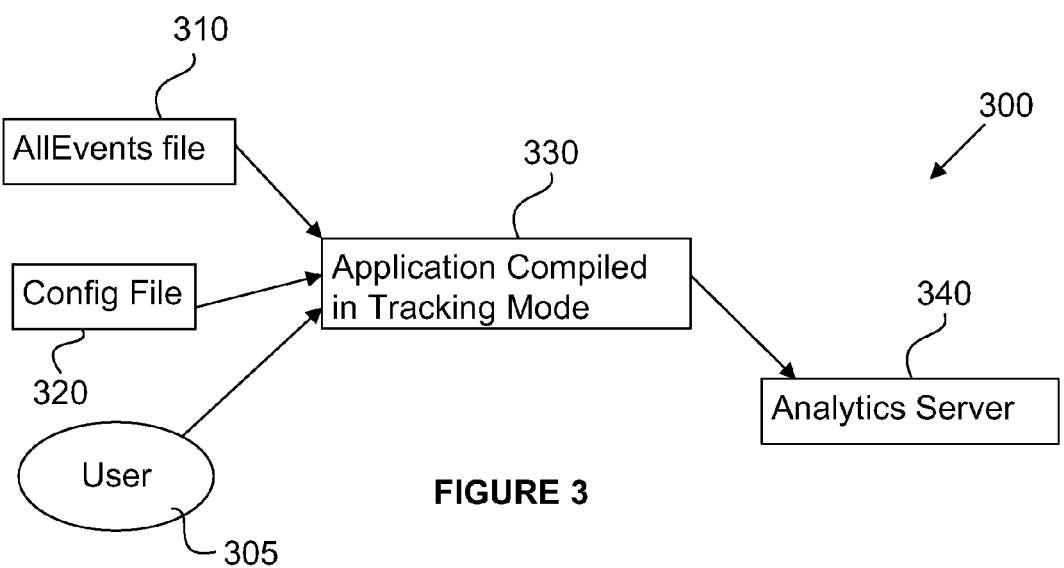
FIG. 3 illustrates an exemplary tracking mode workflow according to certain embodiments.

FIG. 3 illustrates an exemplary tracking mode workflow 300 according to certain embodiments. The application compiled in tracking mode 330 receives the allevents file 310 and the config file 320 as inputs. As the user 305 interacts with the application 330, the application 330 sends appropriate tracking information to the analytics server 340 based on the interaction tracking configuration specified in the config file 320.

Illustration of Creating an Interaction Tracking Configuration

As described with respect to previously described exemplary embodiments, interaction tracking configuration can involve determining events and event details from a running version of an application. As the user interacts with the application, event details are sent to a configuration tool. The configuration tool displays the event details and allows the user to edit and configure them. Exemplary event detail information includes: class name, object identifier, object name, automation name, automation event name, event arguments, parent details (including automation object hierarchy information). These details may be derived from the event related information whenever the user interacts with the application. The current event details can be shown to the user in the configuration tool.

Figure 4:
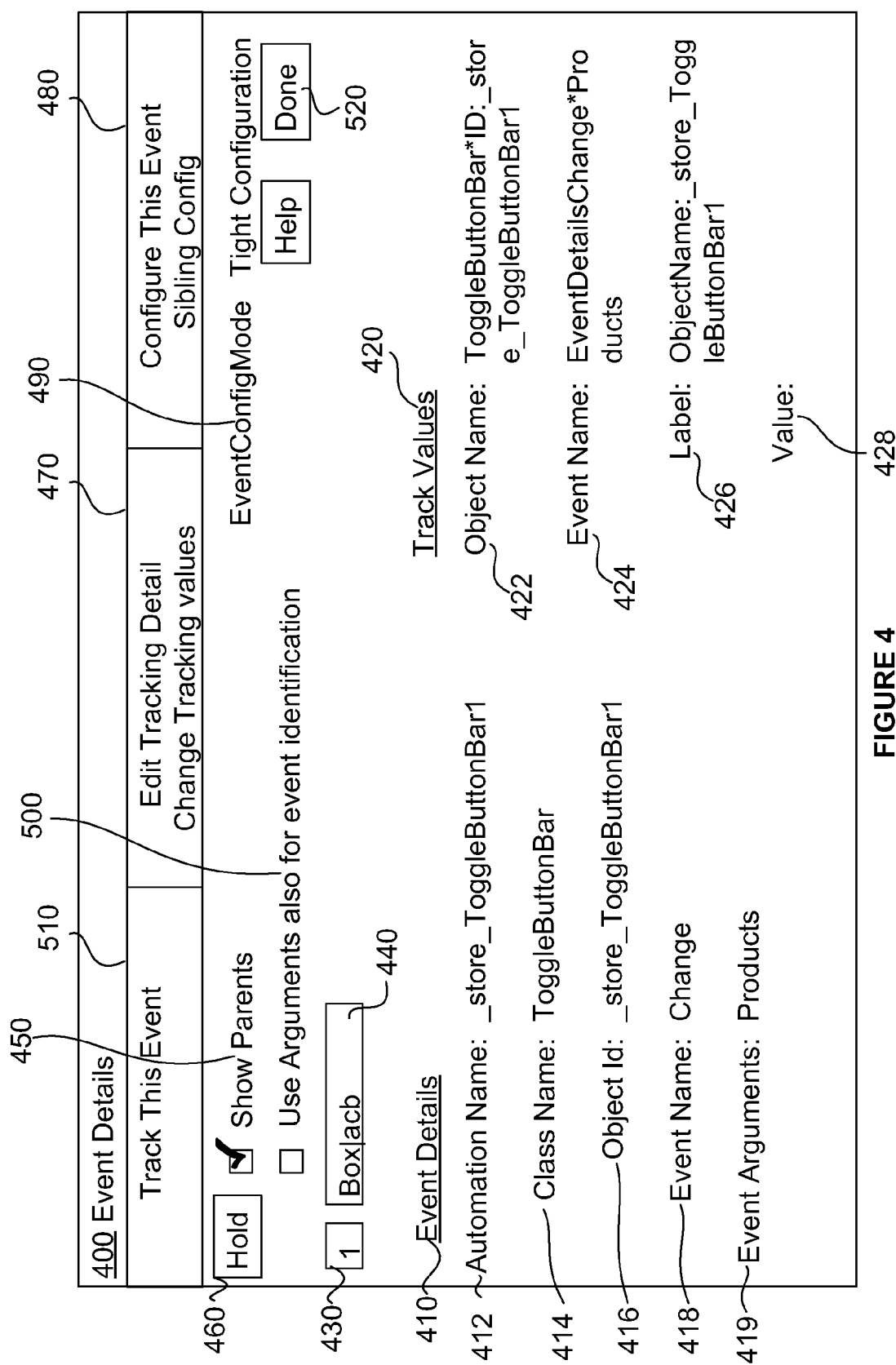
FIG. 4 illustrates an exemplary user interface of a configuration tool according to certain embodiments.

FIG. 4 illustrates an exemplary user interface 400 of a configuration tool according to certain embodiments. An analyst can interact with this window while running an application in configuration mode. In this embodiment, event details 410 are populated based on the most recent event triggered in the application running in configuration mode. Here the event details include an automation name 412, a class name 414, an object identifier 416, an event name 418, and event arguments 419, specified as shown below:

| | |
|---|---|
| Automation Name: | _store_ToggleButtonBar1 |
| Class Name: | ToggleButtonBar |
| Object Id: | _store_ToggleButtonBar1 |
| Event Name: | Change |
| Event Arguments: | Products |

The track values portion 420 describes the values that will be used for sending the tracked event to an analytics server or collector, if this event is used for tracking. In this example, the tracked values include an object name 422, an event name 424, a label 426, and a value 428, as shown in below:

| | |
|---|---|
| Object Name: | ToggleButtonBar*ID:_store_ToggleButtonBar1 |
| Event Name: | EventDetailsChange*Products |
| Label: | ObjectName:_store_ToggleButtonBar1 |
| Value: | |

The parent section number stepper 430 allows an analyst to view or select for tracking the parents of the current selected object by changing the parent index. The currently selected object details are available in the Event Details 410, including the automation name 412, class name 414, and object identifier 416. The parent details box 440 displays the parent selected using the parent section number stepper 430. In this embodiment, the object is represented as className|objectid. The show parent option 450 allows the analyst to select whether to see the parents or not. An analyst may not like to see the parents when, for example, the event changed the application status. The application hold controller 460 allows the analyst to freeze the application. For example, if the analyst knows that one event is going to change the application status, but wishes to see the parent hierarchy of the event target, before listening to the event he or she can freeze the application.

Figure 5:
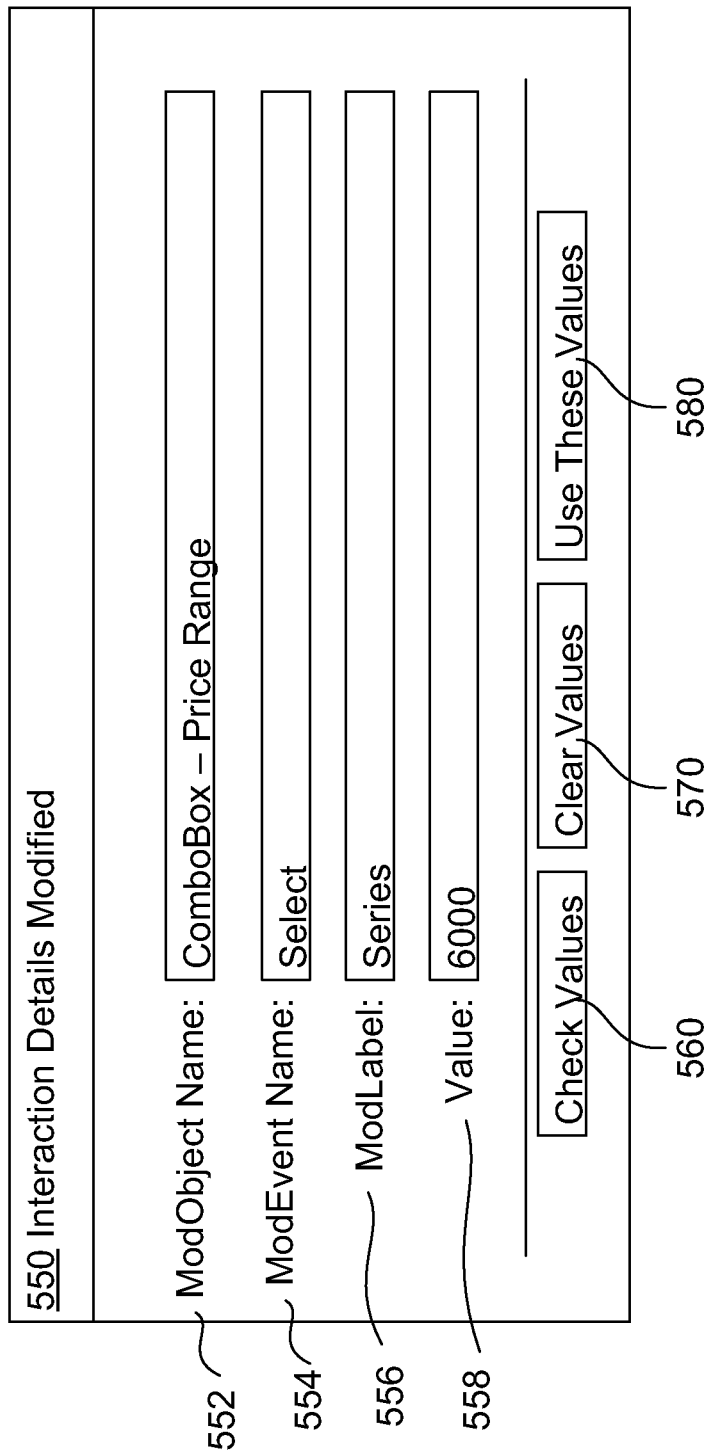
FIG. 5 illustrates an exemplary interaction details modification user interface according to certain embodiments.

The edit tracking details option 470, allows an analyst to modify the values sent to the analytics server. FIG. 5 illustrates an exemplary interaction details modification user interface 550 according to certain embodiments. An analyst may use this interface to replace names with appropriate non-technical names. For example, the analyst may rename the object name 552 "ComboBox—Price Range," the event name 554 "Select," the label name 556 "Series," and provide a value "6000" which limits the events that are tracked to only those in which the value is equal to the value 6000. For example, if some information related to a particular event corresponds to a number (e.g., the event argument is 6000), the analyst can restrict the tracking of the event using that specific number. After modifying the interaction details, an analyst can confirm the correctness of the entered parameters using the check values button 560, clear the values using the clear values button 570, or accept the values and return to the configuration interface 400 using the use these values button 560.

Returning to FIG. 4, the configure this event option 480 is used in this example for sibling configuration. The event configuration mode 490 specifies the type of the configuration mode the user is using. Sibling configuration and configuration modes are explained in the sections below.

The use argument for event identification option 500 retrieves an argument from the application from which the event details were retrieved. For example, when the analyst selects a value from combo box the value selected is the event argument. If the analyst is interested in tracking the event for any value, the use argument for event identification option 500 should not be selected. However, if the user is interested in a specific argument, such as, for example, a particular tab on a tab menu, the appropriate argument can be retrieved from the application using this option 500.

The track this event option 510 allows the analyst to identify whether the displayed event will be tracked or not in the deployed application. Once the analyst has identified and configured all desired event tracking, the analyst can select the done option 520 to conclude configuration. The interaction tracking configuration may be created at this time. For example, a file comprising the interaction traction configuration information may be created and sent to an appropriate storage location where it can be accessed by the application running in tracking mode.

Examples of Different Configuration Modes

Certain embodiments provide different configuration modes. One exemplary embodiment provides a general mode and an event driven mode. The general configuration mode is for creating and modifying a configuration without running the application. Among other things, this mode can be used if the analyst is interested in general level configuration for a particular component. For example, an analyst may want to track all operations on all instances of charts type objects in the applications. In such scenarios, he or she can simply select the class to which he or she would like to track.

Event based configuration, on the other hand, is based on the events generated from the running application. Certain embodiments provide different event based configurations, including: tight configuration and sibling configuration. In a tight configuration, the event triggering component has to be exactly the same as the current selected component. This means that the class name, object identifier, automation name, event name and the parent hierarchy needs to match.

A sibling configuration can be used to track a particular event on similar components. For example, an analyst may want to track click events occurring on any of the thumbnail objects displayed in an application screen. This configuration can be specified by identifying one of the thumbnail objects and then identifying a common parent of other objects that should be included in the event configuration. A parent is a component that has sub-components.

Figure 6:
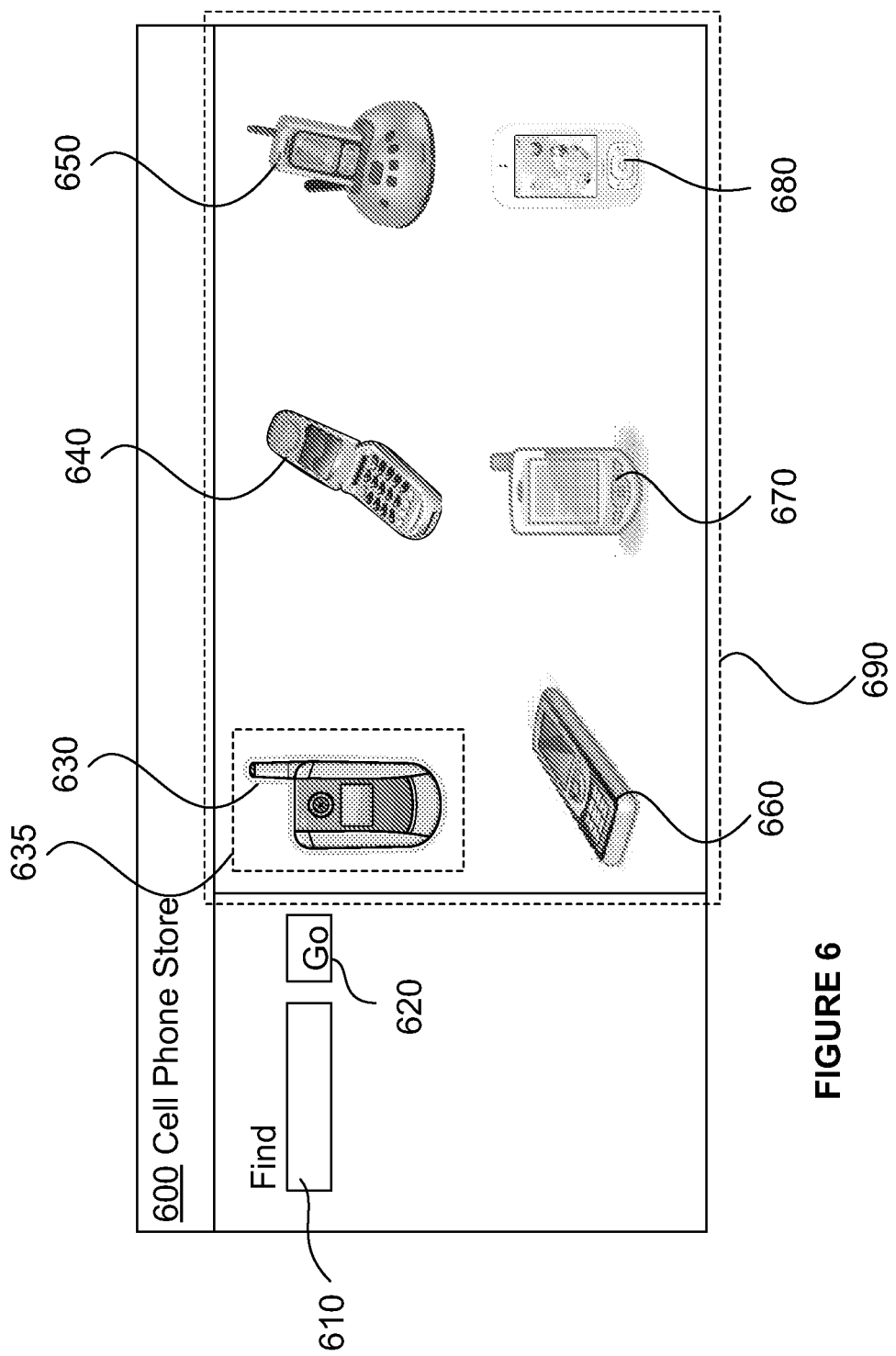
FIG. 6 illustrates an exemplary application in which a parent includes multiple objects for which a common sibling configuration is created according to certain embodiments.

FIG. 6 illustrates an exemplary application 600 in which a parent includes multiple objects for which a common sibling configuration is created according to certain embodiments. The exemplary application 600 allows a user to search for cell phones using a search tool 610 to input a search term and go button 620 to initiate a search. The results of the search are returned in window 690. In one embodiment, an analyst runs the application 600 and concurrently runs a configuration tool. The analyst interacts with the application and clicks on a particular cell phone 630 causing the cell phone to be indicated as a selected cell phone with a selection indicator 635. The configuration tool may recognize this selection event and allow the analyst to configure tracking of the selection event. To create a sibling configuration, the analyst is presented, in the configuration tool, with information that identifies window 690 as the parent of other objects 640, 650, 660, 670, 680 displayed, in addition to the selected cell phone 630. The analyst can generalize the cell phone selection event to any selection event of any object having the window 690 as a parent. The ability to create event tracking based on a common parent can simplify what would otherwise be complicated or repetitive identification of events.

Examples of Different Event Configuration Options

Generally, certain embodiments provide a significant amount of flexibility and functionality in facilitating the configuration of interaction tracking in a variety of circumstances and to achieve a variety of results. The following examples illustrate a few such configurations, although others are possible.

One exemplary configuration allows tracking of a particular component used in a specific context. This may involve tracking all events associated with that component in that context. For example, a component shopping cart may be used in different places in an application. The marketing team may be interested in how many users did anything with the shopping cart used in one particular context—from the purchase page of the application. The analyst can specify this context as a filter and track user interaction on this component without filtering based on event type so that the appropriate information is tracked.

Alternatively, another exemplary configuration involves tracking a particular component used in a specific context but only for a particular event. For example, in the preceding example, if the marketing team wanted to track only the cases where users click on a 'Pay Now' button on the shopping cart, the tracking can also be filtered based on this particular event.

Another exemplary configuration involves tracking a particular component used in a specific context, only for a particular event with particular details. For example, a ComboBox may have been used in different places in an application. The marketing team may want to track how many people select "PhoneModelA" from the ComboBox. Such tracking can be specified by filtering the tracking based on the particular event, selection of the ComboBox, and based on the particular value, where the ComboBox selected item is "PhoneModel A."

Another exemplary configuration involves simply tracking a component regardless of where it is used in application. For example, a marketing team may want to track any user interaction on a shopping cart component, irrespective of the context of usage of this component, and collect details from this object also (such as, for example, the items on the cart, the price of each item, etc.)

Another exemplary configuration involves tracking a specific user interaction on a component regardless of where it is used in the application. For example, a marketing team may want to track how many users added a product to a shopping cart using the 'AddToCart' operations, which may appear in multiple places and be used on multiple objects.

Another exemplary configuration involves tracking a component used anywhere in an application except in a specific context or contexts. For example, a marketing team may want to track how many users added products to the shopping cart using the 'AddToCart' operations, other than one or two specific context.

Figure 7:
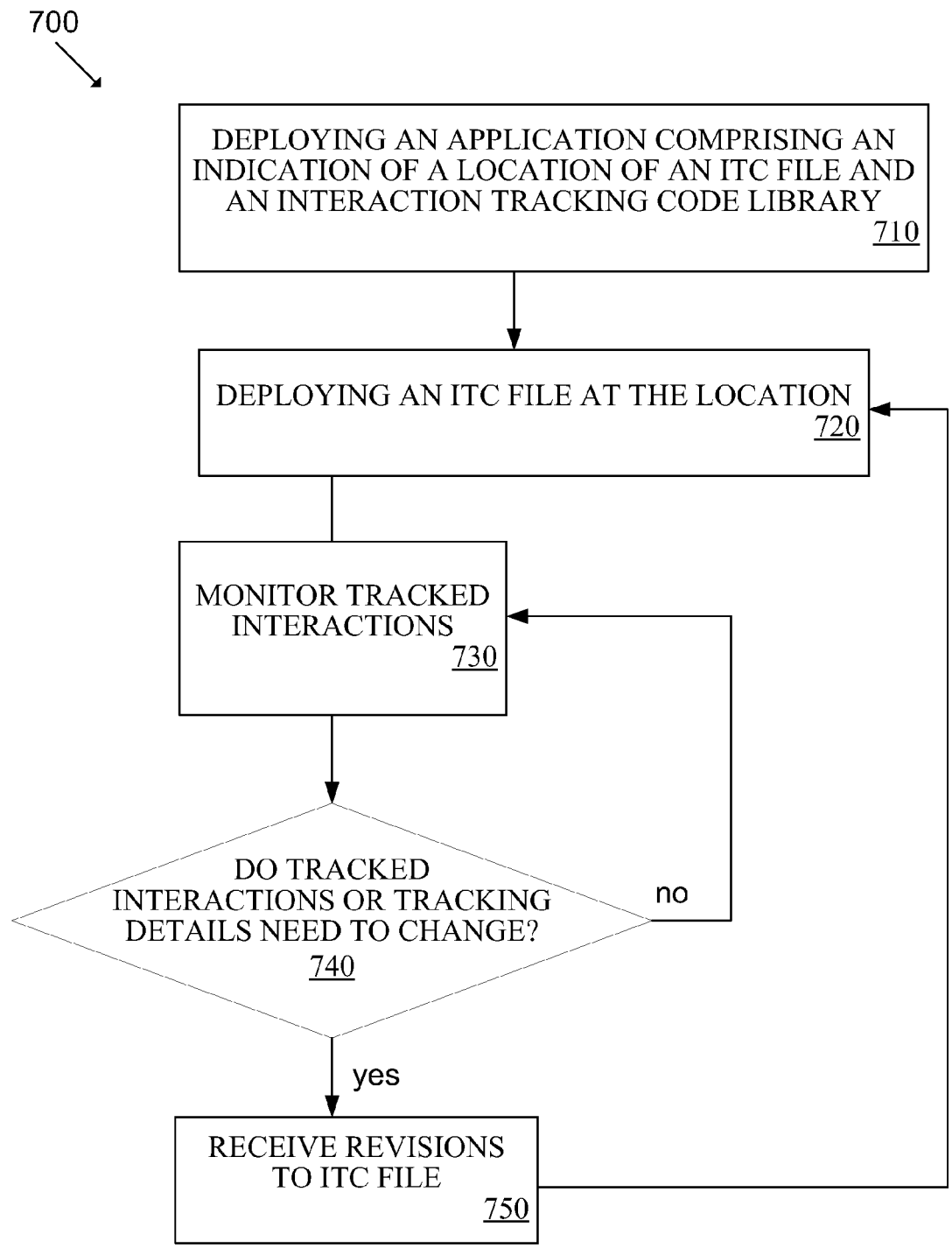
FIG. 7 is a flow chart illustrating an exemplary method of providing interaction tracking configuration information separate from an application, according to certain embodiments.

Illustrative Method of Providing Interaction Tracking Configuration Information Separate from an Application FIG. 7 is a flow chart illustrating an exemplary method of providing interaction tracking configuration information separate from an application, according to certain embodiments. This exemplary method 700 involves separating the interaction tracking configuration from the application program that is tracked. The interaction tracking configuration is stored in an interaction tracking configuration (ITC) file and stored at a location specified within the application. This allows the interaction tracking configuration to be changed without changing or redeploying the deployed application.

The exemplary method 700 comprises deploying an application comprising an indication of a location of an ITC file and that uses an interactive tracking code library, as shown in block 710. FIG. 1 provides an example of such a deployed application 24 comprising an ITC file location 26. The code library used by the deployed application may be compiled in the actual deployed application. The interaction code library provides the functional commands to implement any interaction tracking carried out according to the interaction tracking detail information provided by the separately stored ITC file. For example, the code library may comprise functions that are called in response to events occurring during interactions with the deployed application when the application is executed. Such functions may utilize information from the separately stored ITC file as parameters to implement tracking according to the ITC file's specification. For example, the ITC file may include an indication that a particular event is to be tracked.

A function from the library may be included in the application code related to the event such that, when the event occurs in the application, the function executes with a parameter retrieved from the separately stored configuration file indicating that the event is tracked. Based on this parameter, the function may retrieve, store, or otherwise track information about the event and/or initiate storage or sending of the information about the event to another location, such as to an analytics server. The details of the interaction tracking may be further specified by the ITC file, for example to implement the various types of tracking described above, and to indicate the location of an analytics server to which the information is sent, among potentially other things. These details may be provided to a function as parameters or otherwise used by a function.

The method 700 further comprises deploying an ITC file at the location specified in the application, as shown in block 720. For example, the location may comprise a network address or other location at which the file can be found. In certain embodiments, the ITC file is separated into multiple files for organizational or other reasons. In other embodiments, the ITC file is provided as information accessible from a database or other data source that stores in the ITC information in a format other than a traditional file format. A variety of techniques may be used to provide the ITC information in a location known to, but separate from, the deployed application. FIG. 1 provides an example of providing an ITC file 38 on the same server 21 that provides the deployed application 24. These locations are merely used as examples.

The method 700 further comprises monitoring the tracked interactions, as shown in block 730. For example, the deployed application may send information about tracked events to an analytics server. Monitoring the tracked interactions may involve ensuring that appropriate information is received by the analytics server and/or examining the information or information derived from received information.

The method 700 further comprises determining whether the tracked interactions or the tracking details need to change, as shown in block 740. Changes may be required in a variety of circumstances. In some cases, the existing tracking details may not provide the information originally desired, so the details of the tracking may be changed to improve the results of the information tracking. In another exemplary case, a new business need or request for new information may result in a desire to track new information, including events that were previously not tracked. If no changes are desired, the method 700 returns to block 730, where the tracked information is monitored. Since the deployed application may be executed on an ongoing basis, tracked interaction information may continually be monitored. For example, a deployed application may be available on the Internet. As users download versions of the application and execute the application new interaction information may be tracked and sent to an analytics server or other recipient on an ongoing basis.

If changes are required in block 740, the method 700 proceeds to receiving revisions to the ITC file, as shown in block 750. The revisions to the ITC file may be received in a variety of ways, including through the exemplary configuration techniques discussed in the examples above, and/or through the receipt of an entirely new ITC file. The method 700 returns to block 720 where the revised ITC file is deployed. The deployed application accesses the revised ITC file to provide interaction tracking according to the revised interaction tracking details of the revised ITC file.

Illustrative Method of Configuring Interaction Tracking for an Application

Figure 8:
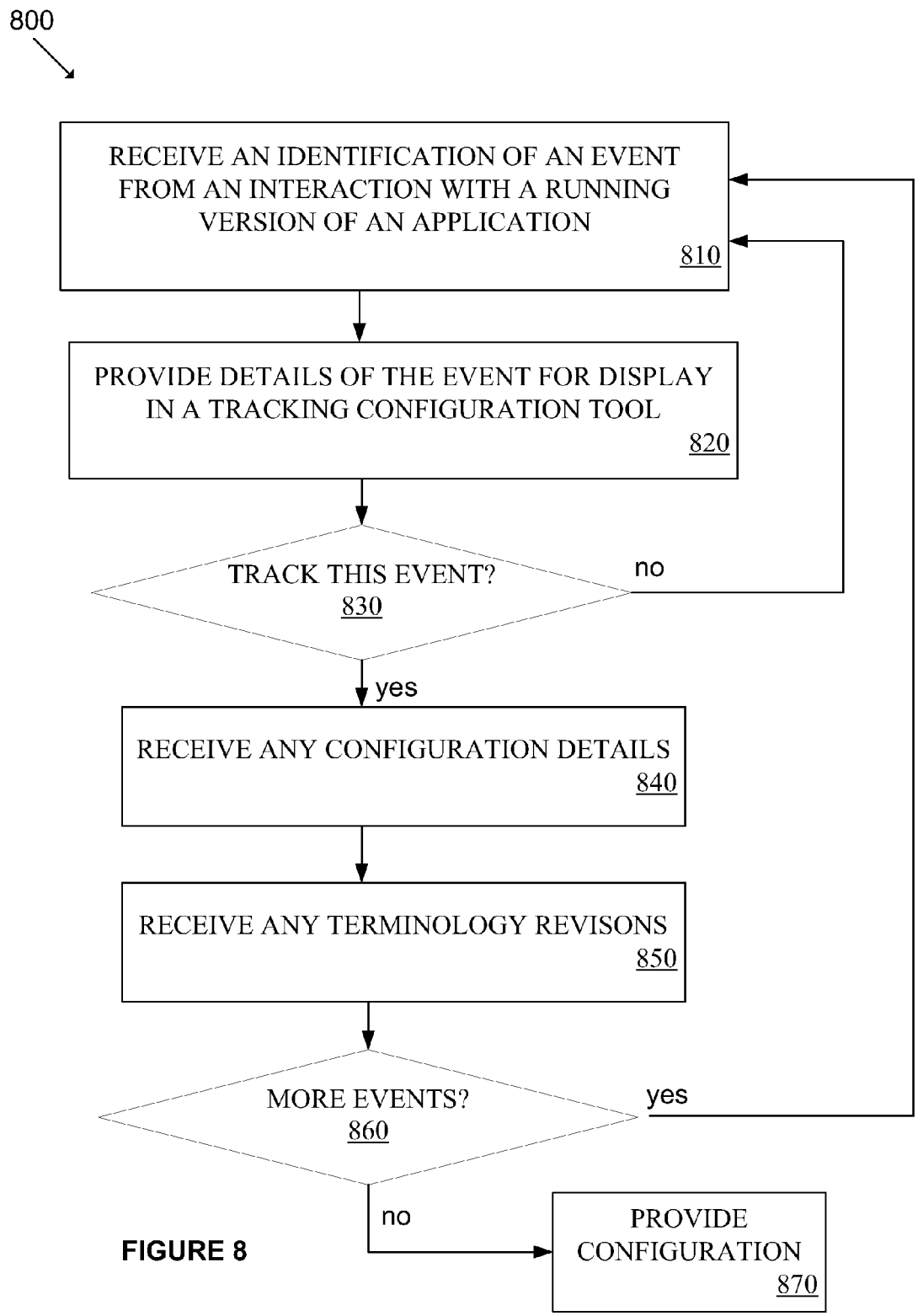
FIG. 8 is a flow chart illustrating an exemplary method of configuring interaction tracking for an application, according to certain embodiments.

FIG. 8 is a flow chart illustrating an exemplary method 800 of configuring interaction tracking for an application, according to certain embodiments. This exemplary method 800 uses a running version of the application to allow identification of events that will be tracked. The method 800 also uses a tracking configuration tool to facilitate the configuration of interaction tracking details. Identifying and configuring events in this way can simplify the configuration tasks by reducing the need for understanding or accessing the actual code of the application.

The exemplary method 800 comprises receiving an identification of an event from an interaction with a running version of an application, as shown in block 810. For example, an analyst may run an application and a configuration tool concurrently. As the analyst interacts with the application, triggering events within the application, the application may send information about these triggered events to the tracking configuration tool, which receives the identification of the event from the application according to this method 800. In some embodiments, the identification of the event is received from an application running in a configuration mode that is different from the mode in which the application will ultimately be deployed, such as, for example, in a tracking mode. In the configuration mode, the application may run as it normally would but send the event information to the configuration tool. In other embodiments, a configuration tool runs or presents an application rather than having the application running separately. The application may thus be run separate from or within the configuration tool.

The method 800 further comprises providing details of the event for display in a tracking configuration tool, as shown in block 820. For example, the method 800 may involve displaying information about an application object associated with the event, the type of object, the type of event, the parent of the object associated with the event, among a variety of other details. An event identification component that identifies events triggered on the running application may (or may not) filter low level events to identify events with an appropriate amount of granularity and detail. For example, enough detail may be provided to allow an analyst to distinguish between a user clicking on a header on a data grid and the user clicking on a particular item on the data grid.

The method 800 further comprises receiving a determination of whether to track this event, as shown in block 830. If not, the method 800 returns to block 810 to receive another identification of another event from the next interaction with the running version of the application. If event tracking is selected in block 830, the method 800 receives configuration details associated with tracking the event, as shown in block 840. For example, the configuration details may specify or filter the circumstances or conditions under which the event will be tracked. The event may only be tracked if an object has a certain value, or if the event is received in a particular context, etc. The configuration may broaden the tracking configuration beyond the scope of the originally identified events, for example to include tracking of the event when it occurs on different objects, such as sibling objects, or on any object.

The method 800 further comprises receiving any terminology revisions, as shown in block 850. The terminology associated with the tracked event may be revised from the technical/program language terminology to technology more appropriate for the ultimate destination of the tracked interaction information. For example, if the information is to be sent to an analytics server and used by a company's marketing group, the terminology associated with the information tracking may be revised to reflect appropriate marketing terminology.

The method 800 further comprises determining whether there are additional events for which tracking configuration is needed, as shown in block 860. If more events need to be identified and configured for tracking, the method returns to block 810 where an additional identification of an event from a next interaction with the running version of the application can be received. If no more events need to be identified and the configuration is complete, the method 800 can proceed to block 870 where the configuration can be provided for use. For example, the configuration may be integrated (automatically or semi-automatically) into the application itself. Alternatively, as described in various embodiments above, the configuration may be stored and provided separate from the application, such as, for example, within a configuration file that is accessible by the deployed application.

Illustrative Example of Switching Analytics Server

In certain embodiments, a configuration file can be used to specify the analytics server that will receive event information from the application. In addition, a configuration file may specify that multiple analytics servers will receive information. The code of the application itself can, in such cases, track information in a manner that is not specific to any particular analytics server. A configuration application can allow an analyst to select one or more of potentially many analytics servers and other recipients. In some cases, a particular analytics server is referred to in the code of an application through the incorporation of a library of functions specific to that analytics server. An application may include many such libraries to facilitate the option of sending information to any analytics server for which a corresponding code library is included.

Illustrative Example of Custom-Coded Event Tracking

While certain embodiments avoid the need to provide specific code in an application for each event which needs to be tracked, a developer or analyst may still provide such code in some embodiments. For example, a developer may manually code specific coded event tracking. Doing so may reduce the need to include some or all of the event tracking libraries or other generic event tracking information. Doing so may also provide greater flexibility, in some cases, with respect to switching on and off certain events and otherwise configuring the event tracking. In some cases, some events will include manual or custom code defining the event tracking and other events will utilize the automatic event tracking features provided through one or more code libraries. In either case, an analyst can still utilize a configuration file or other configuration setting to change the technical to business translation and some of the other tracking details without redeploying the application.

General

Numerous specific details are set forth herein to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter. Some portions are presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm is here, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, it is appreciated that throughout this specification discussions utilizing terms such as "processing," "computing," "calculating," "determining," and "identifying" or the like refer to actions or processes of a computing platform, such as one or more computers or a similar electronic computing device or devices, that manipulate or transform data represented as physical electronic or magnetic quantities within memories, registers, or other information storage devices, transmission devices, or display devices of the computing platform.

Certain embodiments provide techniques for enabling and configuring tracking of user interactions on computer applications. These embodiments are merely illustrative. In short, the techniques and the other features described herein have uses in a variety of contexts, not to be limited by the specific illustrations provided herein. It should also be noted that embodiments may comprise systems having different architecture and information flows than those shown in the Figures. The systems shown are merely illustrative and are not intended to indicate that any system component, feature, or information flow is essential or necessary to any embodiment or limiting the scope of the present disclosure. The foregoing description of the embodiments has been presented only for the purpose of illustration and description and is not intended to be exhaustive or to limit the disclosure to the precise forms disclosed. Numerous modifications and adaptations are apparent to those skilled in the art without departing from the spirit and scope of the disclosure.

In addition, with respect to the computer implementations depicted in the Figures and described herein, certain details, known to those of skill in the art have been omitted. For example, software tools and applications that execute on each of the devices and functions performed thereon are shown in FIG. 1 as functional or storage components on the respective devices. As is known to one of skill in the art, such applications may be resident in any suitable computer-readable medium and execute on any suitable processor. For example, the devices each may comprise a computer-readable medium such as a random access memory (RAM), coupled to a processor that executes computer-executable program instructions stored in memory. Such processors may comprise a microprocessor, an ASIC, a state machine, or other processor, and can be any of a number of computer processors. Such processors comprise, or may be in communication with a computer-readable medium which stores instructions that, when executed by the processor, cause the processor to perform the steps described herein.

A computer-readable medium may comprise, but is not limited to, an electronic, optical, magnetic, or other storage or transmission device capable of providing a processor with computer-readable instructions. Other examples comprise, but are not limited to, a floppy disk, CD-ROM, DVD, magnetic disk, memory chip, ROM, RAM, an ASIC, a configured processor, optical storage, magnetic tape or other magnetic storage, or any other medium from which a computer processor can read instructions. A computer-readable medium may transmit or carry instructions to a computer, including a router, private or public network, or other transmission device or channel, both wired and wireless. The instructions may comprise code from any suitable computer-programming language, including, for example, C, C++, C#, Visual Basic, Java, Python, Perl, and JavaScript.

While the network shown in FIG. 1 may comprise the Internet, in other embodiments, other networks, such as an intranet, or no network may be used. Moreover, methods may operate within a single device. Devices can be connected to a network as shown. Alternative configurations are of course possible. The devices may also comprise a number of external or internal devices such as a mouse, a CD-ROM, DVD, a keyboard, a display, or other input or output devices. Examples of devices are personal computers, digital assistants, personal digital assistants, cellular phones, mobile phones, smart phones, pagers, digital tablets, laptop computers, Internet appliances, other processor-based devices, and television viewing devices. In general, a device may be any type of processor-based platform that operates on any operating system capable of supporting one or more client applications or media content consuming programs. The server devices may be single computer systems or may be implemented as a network of computers or processors. Examples of a server device are servers, mainframe computers, networked computers, a processor-based device, and similar types of systems and devices.

What is claimed is:

1. A computer implemented method comprising:
providing an application comprising an indication of a location of a configuration file, wherein the configuration file specifies user interactions to be tracked by the application when the application is executed;
providing the configuration file at the location indicated in the application, wherein, when executed, the application determines how to track user interactions by accessing the configuration file at the location separate from the executing application, wherein, in response to a user interaction occurring in the executing application, a function of the application executes using one or more parameters that are retrieved from the configuration file and that indicate that the user interaction is tracked, the one or more parameters further indicating whether the function will send the information about the user interaction to an analytics server; and
receiving a revision to the configuration file and replacing the configuration file with a revised configuration file at the location, wherein replacing the revised configuration file at the location changes the user interactions to be tracked by the application, wherein, when executed, the application tracks user interactions according to the revised configuration file.

2. The method of claim 1, wherein the application uses a library that provides functional commands to implement user interaction tracking according to the configuration file.

3. The method of claim 2, wherein the library provides functions that are called in response to user interactions occurring on the application when the application is executed on a computing platform.

4. The method of claim 3, wherein a function utilizes information from the configuration file as a parameter to implement user interaction tracking.

5. The method of claim 1, wherein the one or more parameters indicate whether the function will track information about the user interaction.

6. The method of claim 1, wherein the one or more parameters indicate a location of the analytics server.

7. The method of claim 1, wherein the location comprises a network address of the configuration file.

8. The method of claim 1 further comprising monitoring user interactions tracked by the application and determining whether a change is required.

9. The method of claim 1, wherein receiving a revision to the configuration file comprises receiving a new configuration file.

10. A computer implemented method comprising:
receiving, at a first application, an identification of user interaction occurring during execution of a second application on a computing platform;
providing details of the user interaction for display in the first application;
receiving, at the first application, (i) an indication of whether to track the user interaction and, (ii) when the indication is to track the user interaction, configuration details associated with said tracking the user interaction, the configuration details specifying that the user interaction is tracked regardless of which object of the second application is associated with the user interaction; and
providing a configuration for use by the second application in tracking occurrence of the user interaction when the second application is executed, wherein tracking the user interaction is based at least in part on the configuration, the configuration separate from the executing second application, and wherein the configuration includes an indication to track different user interactions.

11. The method of claim 10, wherein the configuration details specify filtering user interaction tracking based on conditions associated with the user interaction tracked.

12. The method of claim 10, wherein the configuration details specify filtering user interaction tracking based on a value within the second application.

13. The method of claim 10, wherein the configuration details comprise a sibling configuration.

14. The method of claim 10, wherein the user interaction is tracked by the second application, and wherein, in response to the user interaction, the second application sends information about the user interaction to the first application.

15. The method of claim 10, wherein the second application is executing in a configuration mode, the configuration mode providing a mode for setting user interactions to be tracked, the configuration mode different from a user interaction tracking mode in which the second application tracks information according to the configuration.

16. The method of claim 10, wherein providing details of the user interaction for display in the first application comprises displaying information about an application object associated with the user interaction, a type of object, a type of user interaction, or a parent of the object associated with the user interaction.

17. The method of claim 10, wherein the configuration comprises one or more terminology revisions.

18. The method of claim 10, wherein the second application and the first application execute concurrently on a single computing device.

19. The method of claim 10, wherein the second application executes within the first application.

20. The method of claim 10 further comprising, if another user interaction is to be configured for tracking, receiving an additional identification of the another user interaction from a next interaction with the second application.

21. The method of claim 10, wherein providing the configuration comprises providing a configuration file.

22. A system comprising:
a processor; and
a computer-readable medium comprising instructions, the instructions, when executed by the processor, providing steps comprising:
providing an application comprising an indication of a location of a configuration file, wherein the configuration file specifies user interactions to be tracked by the application when the application is executed;
providing the configuration file at the location indicated in the application, wherein, when executed, the application determines how to track user interactions by accessing the configuration file at the location separate from the executing application, wherein, in response to a user interaction occurring in the executing application, a function of the application executes using one or more parameters that are retrieved from the configuration file and that indicate that the user interaction is tracked, the one or more parameters further indicating whether the function will send the information about the user interaction to an analytics server; and
receiving a revision to the configuration file and replacing the configuration file with a revised configuration file at the location, wherein replacing the revised configuration file at the location changes the user interactions to be tracked by the application, wherein, when executed, the application tracks user interactions according to the revised configuration file.

23. A non-transitory computer-readable medium on which is encoded program code, the program code comprising:
program code for providing an application comprising an indication of a location of a configuration file, wherein the configuration file specifies user interactions to be tracked by the application when the application is executed;
program code for providing the configuration file at the location indicated in the application, wherein, when executed, the application determines how to track user interactions by accessing the configuration file at the location separate from the executing application, wherein, in response to a user interaction occurring in the executing application, a function of the application executes using one or more parameters that are retrieved from the configuration file and that indicate that the user interaction is tracked, the one or more parameters further indicating whether the function will send the information about the user interaction to an analytics server; and
program code for receiving a revision to the configuration file and replacing the configuration file with a revised configuration file at the location, wherein, replacing the revised configuration file at the location changes the user interactions to be tracked by the application, wherein, when executed, the application tracks user interactions according to the revised configuration file.

24. A non-transitory computer-readable medium on which is encoded program code, the program code comprising:
program code for receiving, at a user tracking configuration tool, an identification of a first user interaction occurring during execution of an application, on a computing platform, wherein the application is executed on a separate server from the tracking configuration tool;
program code for providing details of the user interaction for display in the user tracking configuration tool;
program code for receiving, at the user tracking configuration tool, (i) an indication of whether to track the user interaction and, (ii) when the indication is to track the user interaction, configuration details associated with said tracking the user interaction, the configuration details specifying that the user interaction is tracked regardless of which object of the application is associated with the user interaction the indication; and
program code for providing a user interaction tracking configuration for use by the application in tracking occurrence of the user interaction during execution of the application, the user interaction tracking configuration separate from the executing application, wherein tracking of the user interaction is based at least in part on the user interaction tracking configuration.

25. A method comprising:
executing instructions on a computing platform to provide an application, the application comprising binary digital electronic signals representing a functioning application with which user interaction is available and an indication of a location of a configuration file stored separately from the binary digital electronic signals representing the application, the application using a library to implement user interaction tracking according to the configuration file;
executing instructions on the computing platform to provide binary digital electronic signals representing the configuration file at the location indicated in the application;
executing instructions on the computing platform causing a revision to the configuration file to be received; and
executing instructions on the computing platform replacing the configuration file with a revised configuration file at the location, wherein, when the application is executed, the application determines how to track user interactions by accessing the revised configuration file at the location separate from the executing application, wherein, in response to a user interaction occurring in the executing application, a function of the application executes using one or more parameters that are retrieved from the revised configuration file and that indicate that the user interaction is tracked, the one or more parameters further indicating whether the function will send the information about the user interaction to an analytics server.

* * * * *